(12) United States Patent
Maeshima et al.

(10) Patent No.: US 10,101,688 B2
(45) Date of Patent: Oct. 16, 2018

(54) GEAR UNIT, DEVELOPING DEVICE, AND MANUFACTURING METHOD THEREFOR

(71) Applicant: CANON KABUSHIKI KAISHA, Tokyo (JP)

(72) Inventors: Hideki Maeshima, Mishima (JP); Shuichi Gofuku, Numazu (JP); Hiroki Shimizu, Fuji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/005,462

(22) Filed: Jan. 25, 2016

(65) Prior Publication Data

US 2016/0216637 A1 Jul. 28, 2016

(30) Foreign Application Priority Data

Jan. 26, 2015 (JP) .................................. 2015-012708

(51) Int. Cl.
| | |
|---|---|
| G03G 21/18 | (2006.01) |
| G03G 15/08 | (2006.01) |
| G03G 21/16 | (2006.01) |
| F16H 1/06 | (2006.01) |
| F16H 1/20 | (2006.01) |

(52) U.S. Cl.
CPC ..... *G03G 15/0896* (2013.01); *G03G 15/0806* (2013.01); *G03G 21/1647* (2013.01); *F16H 1/06* (2013.01); *F16H 1/20* (2013.01); *G03G 2221/1657* (2013.01)

(58) Field of Classification Search
CPC ............... G03G 15/08; G03G 15/0822; G03G 15/0896; G03G 21/1857; G03G 21/1803; F16H 1/06; F16H 1/20

USPC ................................................. 399/111, 109
See application file for complete search history.

(56) References Cited

U.S. PATENT DOCUMENTS

| | | | | |
|---|---|---|---|---|
| 5,294,968 | A * | 3/1994 | Ueda ...................... | B62D 53/08 222/DIG. 1 |
| 2005/0115043 | A1* | 6/2005 | Maeshima ......... | G03G 15/0894 29/402.08 |
| 2011/0280621 | A1* | 11/2011 | Suzuki ............... | G03G 21/1821 399/111 |
| 2011/0318052 | A1* | 12/2011 | Shirayanagi ....... | G03G 21/1842 399/111 |

(Continued)

FOREIGN PATENT DOCUMENTS

| | | |
|---|---|---|
| JP | H06-222625 A | 8/1994 |
| JP | H09-311517 A | 12/1997 |

(Continued)

*Primary Examiner* — Walter L Lindsay, Jr.
*Assistant Examiner* — Arlene Heredia Ocasio
(74) *Attorney, Agent, or Firm* — Canon U.S.A., Inc. IP Division

(57) ABSTRACT

A gear unit includes a bearing configured to rotatably support a developer bearing member for developing an electrostatic image, a developing gear configured to include an engaging portion that engages with a shaft of the developer bearing member, at least one drive transmission gear configured to be engaged with the developing gear in such a manner that drive force is transmitted between the gears, and a cover member configured to be attached to the bearing so as to sandwich the developing gear between the bearing and the cover member, wherein the cover member supports the developing gear until the developing gear is engaged with the developer bearing member.

24 Claims, 9 Drawing Sheets

(56) References Cited

U.S. PATENT DOCUMENTS

| | | | | |
|---|---|---|---|---|
| 2013/0170845 A1* | 7/2013 | Itabashi | ............... | G03G 15/757 399/12 |
| 2013/0209137 A1* | 8/2013 | Hayashi | ............. | G03G 21/1623 399/111 |
| 2015/0003868 A1* | 1/2015 | Shimizu | ............. | G03G 15/0896 399/119 |
| 2015/0071684 A1* | 3/2015 | Chino | ................ | G03G 21/1647 399/262 |
| 2015/0090060 A1* | 4/2015 | Kobayashi | ......... | G03G 21/1647 74/412 R |
| 2015/0117879 A1* | 4/2015 | Fujii | ................. | G03G 15/0862 399/27 |
| 2015/0185662 A1* | 7/2015 | Itabashi | ............. | G03G 21/1857 399/262 |
| 2015/0205226 A1* | 7/2015 | Komatsu | ............ | G03G 15/0874 399/258 |
| 2015/0277367 A1* | 10/2015 | Maeshima | ......... | G03G 21/1857 399/167 |
| 2015/0277370 A1* | 10/2015 | Maeshima | ......... | G03G 21/1864 399/279 |
| 2016/0124347 A1* | 5/2016 | Isobe | ................ | G03G 15/0874 399/109 |

FOREIGN PATENT DOCUMENTS

| | | | |
|---|---|---|---|
| JP | 2009288286 A | | 12/2009 |
| JP | 2014-016497 A | | 1/2014 |
| JP | 2014-106442 A | | 6/2014 |
| WO | WO 2014/092208 | * | 6/2014 |

* cited by examiner

GEAR UNIT, DEVELOPING DEVICE, AND MANUFACTURING METHOD THEREFOR

BACKGROUND OF THE INVENTION

Field of the Invention

The present invention relates to a gear unit used for driving a developer bearing member. The present invention also relates to a process cartridge and an image forming apparatus using a gear unit. In particular, the present invention is suitably applied to a color electrophotographic image forming apparatus.

Herein, an electrophotographic image forming apparatus is an image forming apparatus that forms images on recording materials by using an electrophotographic image forming system. Examples of the electrophotographic image forming apparatus include an electrophotographic copying machine, an electrophotographic printer (a laser beam printer, an LED printer, etc.), a facsimile apparatus, and a word processor.

The aforementioned process cartridge includes at least an image bearing member. In many cases, the process cartridge includes an image bearing member and a process unit. The process unit includes at least one of a charging unit, a developing unit, and a cleaning unit. The process cartridge is attachable to and detachable from a main body of the image forming apparatus.

A developing device includes at least a developer bearing member for developing electrostatic images. A developing frame supporting the developer bearing member and other elements are integrated to form the developing device. The developing device is also attachable to and detachable from the main body of the image forming apparatus.

Description of the Related Art

Conventional electrophotographic image forming apparatuses using an electrophotographic image forming system adopt a process cartridge system. In such an image forming apparatus, an electrophotographic photosensitive drum and a process unit that acts thereon are integrated into a cartridge, which is attachable to and detachable from a main body of the image forming apparatus. With the process cartridge system, users can perform maintenance of the apparatus by themselves without relying on a repairperson. As a result, usability of the apparatus has significantly improved. Thus, the process cartridge system is adopted in many electrophotographic image forming apparatuses.

Japanese Patent Application Laid-Open No. 2009-288286 discusses a method for assembling a developing device included in a process cartridge, in which, when a developing roller or the like is attached to a developer container, both ends of the shaft of the developing roller are rotatably supported by bearings. In such a case, the bearings are fixed to the developer container with screws. In addition, a plurality of gears is rotatably attached to the bearings fixed to the developer container. In addition, a cover member for covering the gears is fixed to the bearings with screws.

However, when such a developing device is assembled, if the bearings, the gears, and the cover member are sequentially attached to the developer container, many assembly steps are required. As a result, since the number of devices to be assembled is increased, the complexity of the assembly work may be increased and the costs may be increased.

SUMMARY OF THE INVENTION

According to an aspect of the present invention, a gear unit includes a bearing configured to rotatably support a developer bearing member for developing an electrostatic image, a developing gear configured to include an engaging portion that engages with a shaft of the developer bearing member, at least one drive transmission gear configured to be engaged with the developing gear in such a manner that drive force is transmitted between the gears, and a cover member configured to be attached to the bearing so as to sandwich the developing gear between the bearing and the cover member, wherein the cover member supports the developing gear until the developing gear is engaged with the developer bearing member.

According to another aspect of the present invention, a developing device includes a developer bearing member configured to develop an electrostatic image, a frame configured to accommodate developer, a bearing configured to be attached to the frame and rotatably support the developer bearing member, a developing gear configured to include an engaging portion that engages with a shaft of the developer bearing member, at least one drive transmission gear configured to be engaged with the developing gear in such a manner that drive force is transmitted between the gears, and a cover member configured to be attached to the bearing so as to sandwich the developing gear between the bearing and the cover member, wherein the cover member includes a temporary support portion for temporarily supporting the developing gear.

According to yet another aspect of the present invention, a process cartridge and an image forming apparatus are provided.

According to yet another aspect of the present invention, a gear unit manufacturing method is provided.

Further features of the present invention will become apparent from the following description of an exemplary embodiment with reference to the attached drawings.

DESCRIPTION OF THE EMBODIMENTS

Hereinafter, an image forming apparatus and a process cartridge according to an exemplary embodiment of the present invention will be described with reference to the drawings.

1. Overall Configuration of the Image Forming Apparatus

Figure 2:
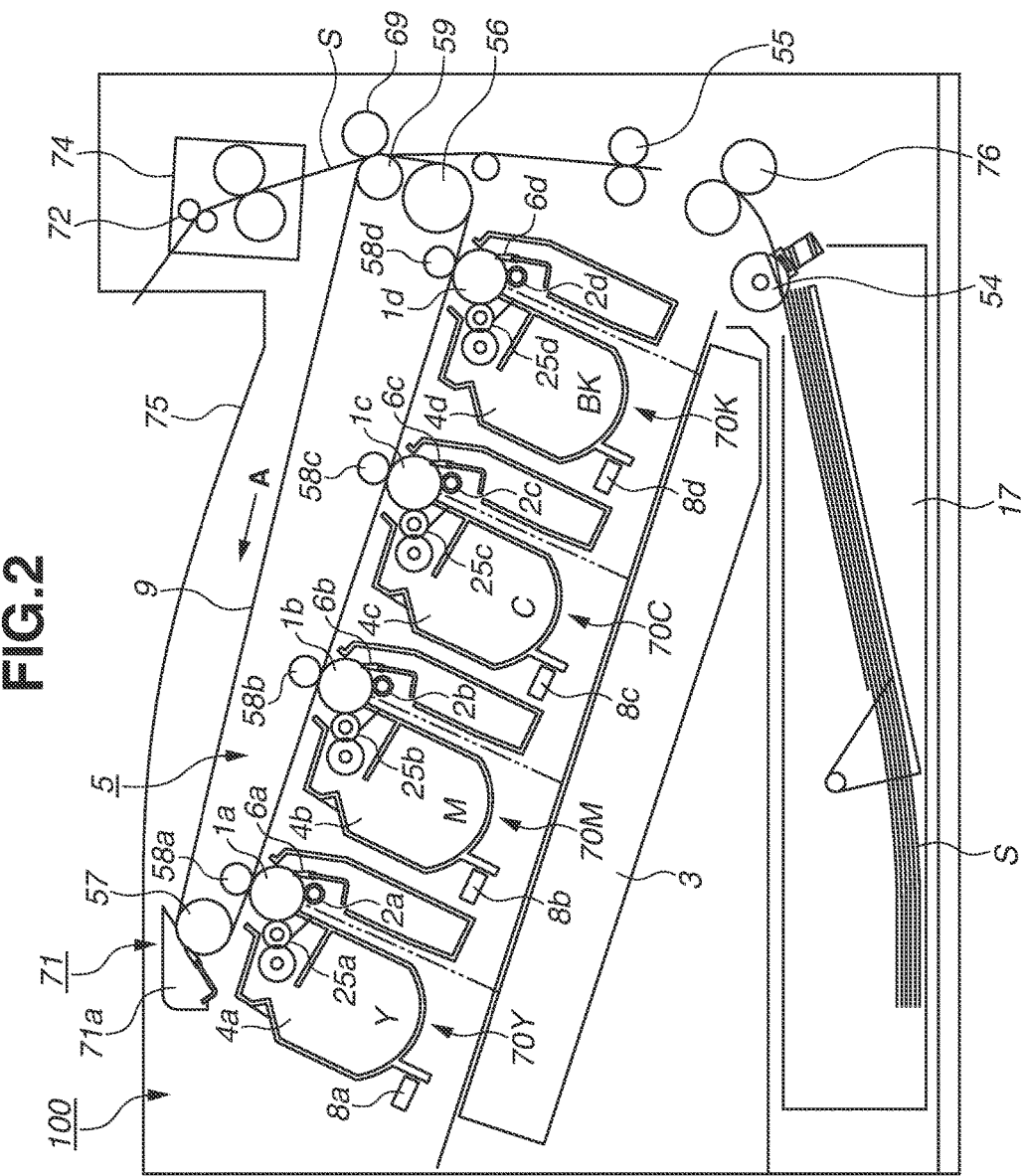
FIG. 2 illustrates a configuration of an electrophotographic image forming apparatus including process cartridges according to the exemplary embodiment.

First, an overall configuration of an electrophotographic image forming apparatus (hereinafter, referred to as an image forming apparatus) 100 will be described with reference to FIG. 2. As illustrated in FIG. 2, four detachable process cartridges 70 (70Y, 70M, 70C, and 70K) are mounted on the image forming apparatus 100 by a mounting member (not illustrated). An upstream side in a direction in which process cartridges 70 are mounted on the image forming apparatus 100 is defined as a front surface side of the image forming apparatus 100. A downstream side in the direction in which the process cartridges 70 are mounted on the image forming apparatus 100 is defined as a rear surface side of the image forming apparatus 100. In FIG. 2, the process cartridges 70 are obliquely arranged side by side with respect to the horizontal direction in a main body of the image forming apparatus 100.

Each of the process cartridges 70 includes an electrophotographic photosensitive drum (hereinafter, referred to as a photosensitive drum) 1 that serves as an image bearing member. In addition, process units such as a charging roller 2, a developing roller 25 that serves as a developer bearing member, a cleaning member 6 are integrally arranged around the photosensitive drum 1. The charging roller 2 uniformly charges a surface of the photosensitive drum 1. The developing roller 25 develops an electrostatic image formed on the photosensitive drum 1 with developer and visualizes an image. The cleaning member 6 removes developer (hereinafter, referred to as toner) remaining on the photosensitive drum 1 after a developer image (or a toner image) formed on the photosensitive drum 1 is transferred onto a recording material.

A scanner unit 3 is arranged below the process cartridges 70. Based on image information, the scanner unit 3 performs selective exposure on each of the photosensitive drums 1 and forms a latent image thereon.

A cassette 17 containing recording materials S is arranged in the lower part of the main body of the image forming apparatus 100. A recording material conveyance unit is arranged in such a manner that each of the recording materials S is conveyed to the upper part of the main body of the image forming apparatus 100 via a secondary transfer roller 69 and a fixing unit 74. More specifically, a feeding roller 54 that separately feeds the recording material S in the cassette 17 one by one, a conveyance roller pair 76 that conveys the fed recording material S, and a registration roller pair 55 that synchronizes a latent image formed on each of the photosensitive drums 1 with the recording material S, are arranged. An intermediate transfer unit 5 is arranged above the process cartridges 70 (70Y, 70M, 70C, and 70K). The intermediate transfer unit 5 servers as an intermediate transfer unit for transferring a toner image formed on each of the photosensitive drums 1 (1a, 1b, 1c, and 1d). The intermediate transfer unit 5 includes a drive roller 56, a driven roller 57, and primary transfer rollers 58 (58a, 58b, 58c, and 58d) arranged opposing to the photosensitive drums 1 of respective colors. The intermediate transfer unit 5 further includes a counter roller 59 arranged at a position opposing to the secondary transfer roller 69. A transfer belt 9 is wound around the rollers included in the intermediate transfer unit 5. The transfer belt 9 faces all of the photosensitive drums 1 and moves circularly while being in contact with the photosensitive drums 1. By applying a voltage to each of the primary transfer rollers 58 (58a, 58b, 58c, and 58d), primary transfer of a toner image is performed from each photosensitive drum 1 onto the transfer belt 9. Then, by applying a voltage to the counter roller 59 arranged inside the transfer belt 9 and to the secondary transfer roller 69, the toner image on the transfer belt 9 is transferred onto the recording material S.

When toner images are formed, each of the photosensitive drums 1 is rotated, and selective exposure is performed by the scanner unit 3 onto the photosensitive drums 1 uniformly charged by the respective charging rollers 2. In this way, electrostatic latent images (or electrostatic images) are formed on the respective photosensitive drums 1. The developing rollers 25 (25a, 25b, 25c, and 25d) serving as developer bearing members develop the respective electrostatic images, thereby forming toner images of the respective colors on the respective photosensitive drums 1. In synchronization with the toner image formation, the registration roller pair 55 conveys the recording material S to a secondary transfer position where the counter roller 59 and the secondary transfer roller 69 contact each other via the transfer belt 9. Then, by applying a transfer bias voltage to the secondary transfer roller 69, secondary transfer is performed in which the toner images of the respective colors on the transfer belt 9 are transferred onto the recording material S. In this way, a color image is formed on the recording material S. The fixing unit 74 applies heat and pressure on the recording material S on which the color image has been formed. Consequently, the toner image is fixed thereto. Thereafter, discharging rollers 72 discharge the recording material S to a discharge unit 75. The fixing unit 74 is arranged in the upper part of the main body of the image forming apparatus 100.

2. Process Cartridge

Figure 3:
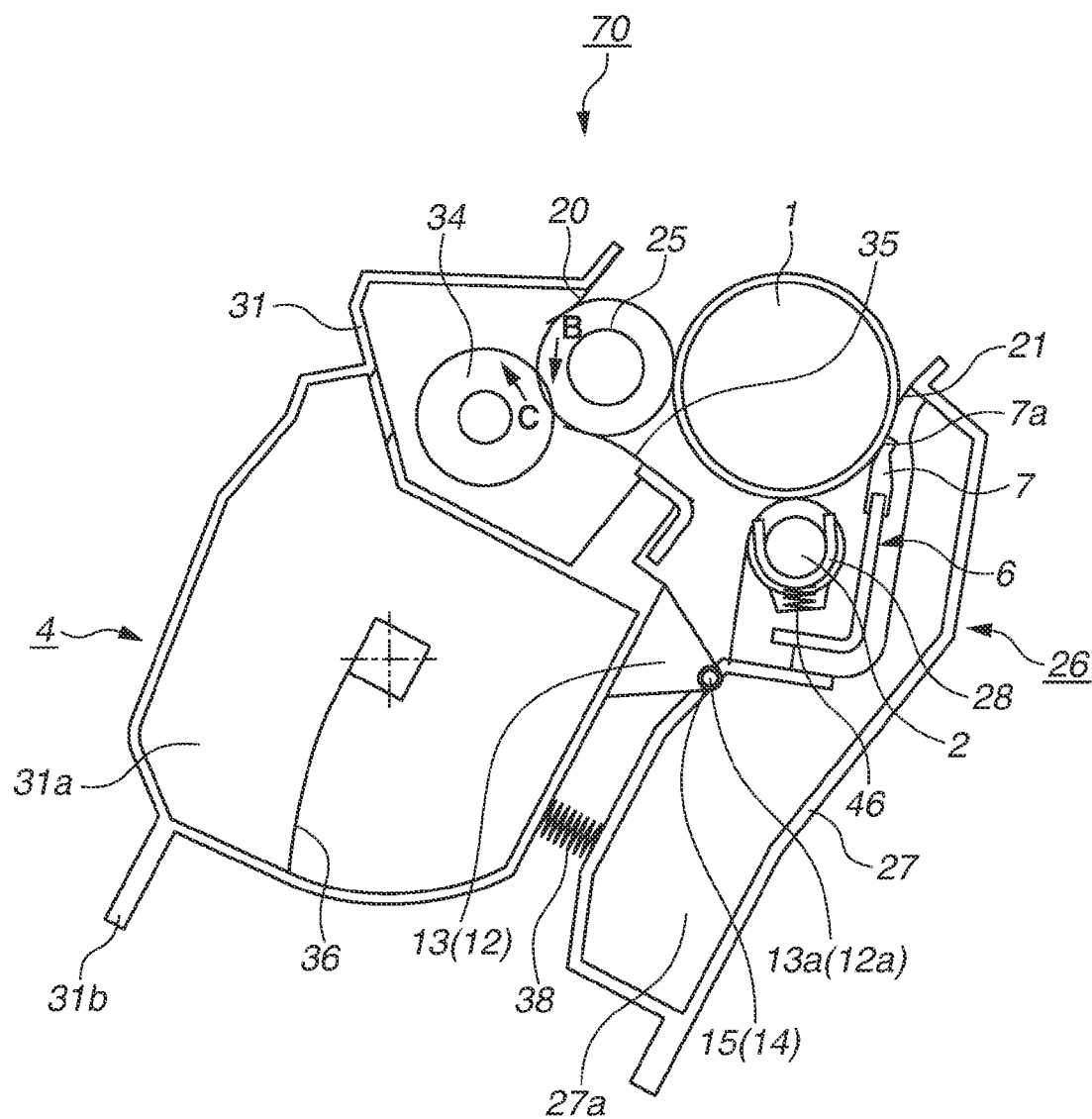
FIG. 3 illustrates a process cartridge according to the exemplary embodiment.

Next, the process cartridges 70 according to the present exemplary embodiment will be described with reference to FIG. 3. FIG. 3 illustrates a principal section of one of the process cartridges 70 containing toner. The process cartridges 70Y, 70M, 70C, and 70K that contain yellow, magenta, cyan, and black toner, respectively, have the same configuration in the present exemplary embodiment. However, the process cartridge 70K containing black toner may have a larger capacity.

Each of the process cartridges 70 (70Y, 70M, 70C, and 70K) includes a cleaning unit 26 (26a, 26b, 26c, or 26d) and a developing unit (developing device) 4 (4a, 4b, 4c, or 4d). While, in the present exemplary embodiment, each process cartridge 70 will be described as a combination of a cleaning unit 26 and a developing unit 4, the configuration thereof is not limited thereto. For example, the cleaning unit 26 may be an independent cleaning device from the process cartridge 70, and the developing unit 4 may be an independent developing device from the process cartridge 70.

Each of the cleaning units 26 according to the present exemplary embodiment includes the photosensitive drum 1 (1a, 1b, 1c, or 1d), the charging roller 2 (2a, 2b, 2c, or 2d), and the cleaning member 6 (6a, 6b, 6c, or 6d).

As described above, the charging roller 2 and the cleaning member 6 are arranged on the circumference of the photosensitive drum 1 in the cleaning unit 26. The cleaning member 6 includes an elastic member 7 formed of a rubber blade, and a cleaning support member 8. An end portion 7a of the elastic member 7 is arranged to contact the photosensitive drum 1 in a counter-rotational direction of the photosensitive drum 1. Residual toner removed from the surface of the photosensitive drum 1 by the cleaning member 6 falls into a removed-toner chamber 27a. In addition, a scooping sheet 21 that prevents the removed toner from leaking out of the removed-toner chamber 27a is arranged to contact the photosensitive drum 1. By transmitting driving force generated by a drive motor (not illustrated), which is a driving source, arranged in the main body to the cleaning unit 26, the photosensitive drum 1 is rotationally driven according to the image forming operation. The charging roller 2 is rotatably attached to the cleaning unit 26 via a charging roller bearing 28. When a charging roller pressing member 46 applies pressure in a direction of the photosensitive drum 1, the charging roller 2 is rotated by the photosensitive drum 1.

The developing unit 4 includes the developing roller 25 that is in contact with the photosensitive drum 1 and is rotated in a direction indicated by an arrow B. The developing unit 4 also includes a developing frame 31 that supports the developing roller 25 and that accommodates developer. The developing roller 25 is rotatably supported by a developing unit front bearing 12 and a developing unit rear bearing 13 that are arranged on front and rear sides of the developing frame 31, respectively. In addition, a toner supplying roller 34 is arranged on the circumference of the developing roller 25. The toner supplying roller 34 serves as a developer supplying member that is in contact with the developing roller 25 and rotated in a direction indicated by an arrow C. In addition, a developing blade 35 that regulates a toner layer on the developing roller 25 is arranged. The rotation directions of the developing roller 25 and the toner supplying roller 34 are not limited to the directions described above. In addition, a toner accommodation portion 31a in the developing frame 31 includes a toner conveyance member 36 that agitates accommodated toner and that conveys the toner to the toner supplying roller 34.

In addition, the developing unit 4 is rotatably attached to the cleaning unit 26. A front supporting pin 14 and a rear supporting pin 15 that are press-fitted into a cleaning frame 27 are engaged in a hanging hole 12a of the developing unit front bearing 12 and a hanging hole 13a of the developing unit rear bearing 13, respectively. In this way, the developing unit 4 is supported to be rotatable with respect to the cleaning frame 27 around the supporting pins 14 and 15.

3. Gear Unit, Gear Unit Manufacturing Method, and Developing Device Manufacturing Method First, a configuration of a gear unit and a method for manufacturing the gear unit will be described. Thereafter, a method for manufacturing a developing device using the gear unit will be described process by process for assembly procedures. The assembly procedures include a gear unit assembly procedure and a developing device assembly procedure, which will be described separately.

(Configuration of Gear Unit, and Gear Unit Assembly Procedure)

Figure 1A:
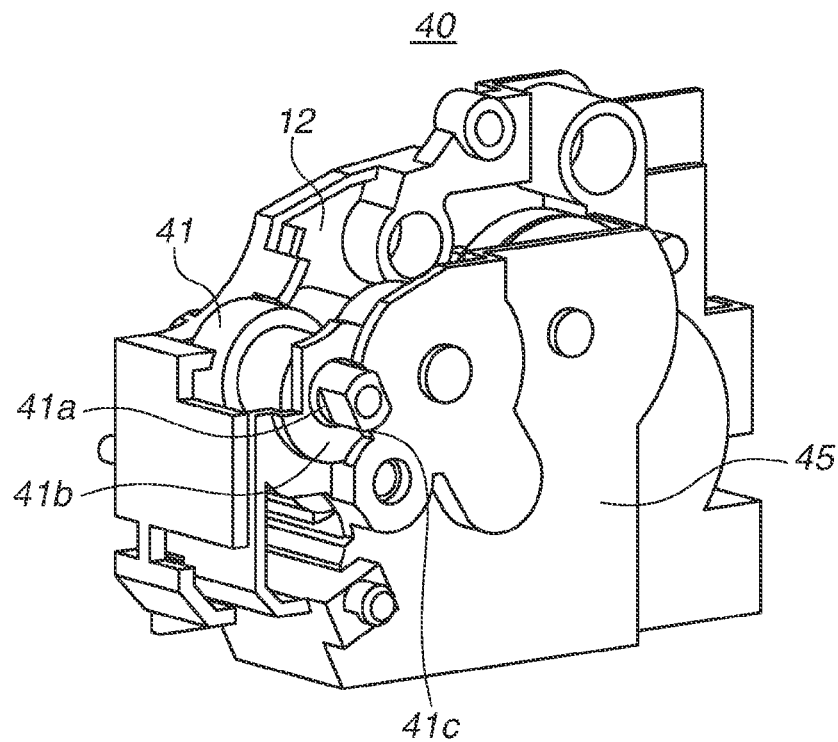
FIGS. 1A and 1B illustrate a gear unit according to an exemplary embodiment.
Figure 1B:
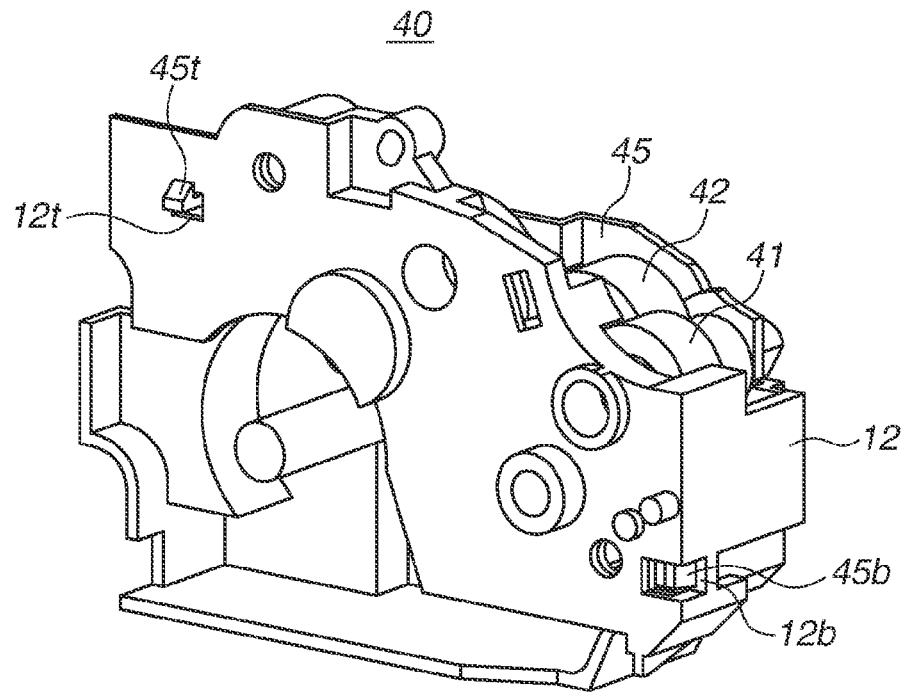

A configuration of a developing gear unit 40 and assembly process thereof will be described with reference to FIGS. 1A, 1B, and 4. Since a gear unit used in a developing device will be described in the present exemplary embodiment, the gear unit is referred to as a developing gear unit. However, the gear unit according to the present exemplary embodiment is applicable not only to a developing gear unit but also to a gear unit used for driving an image bearing member.

Figure 4:
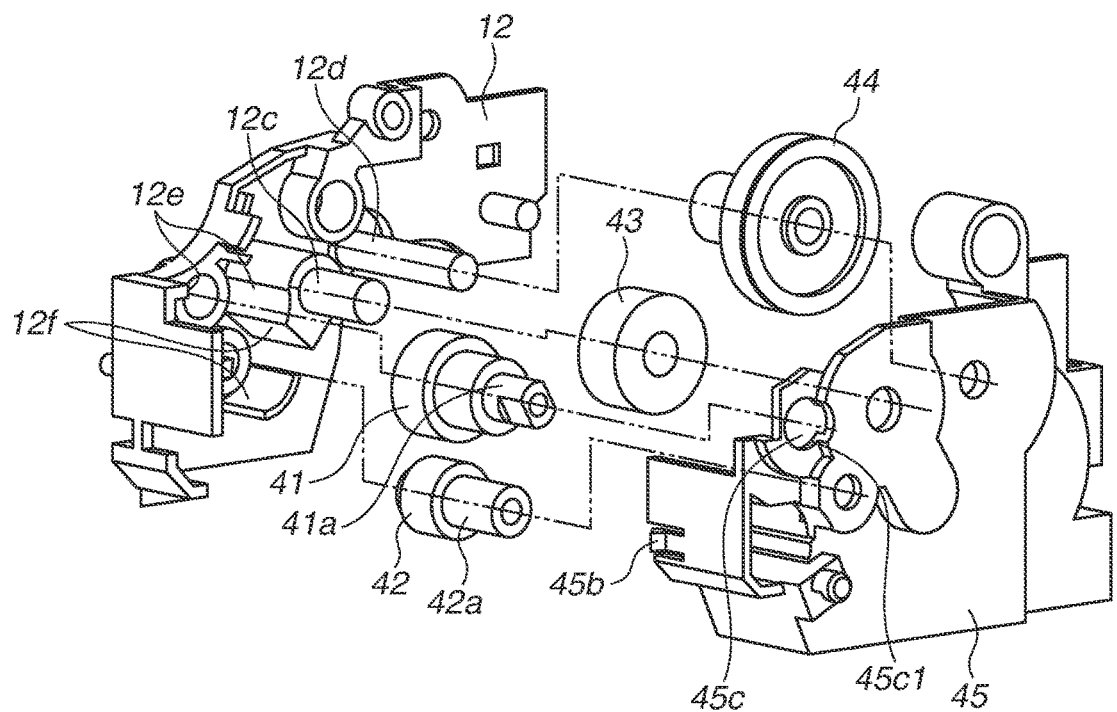
FIG. 4 illustrates the gear unit according to the exemplary embodiment.

First, as illustrated in FIG. 4, a developing roller gear (also referred to as a developing gear) 41, a toner supplying roller gear (also referred to as a supplying gear) 42, and drive transmission gears 43 and 44 are attached to the developing unit front bearing 12. This process is called a gear attachment process. The drive transmission gears 43 and 44 are rotatably supported by corresponding support shafts (12c and 12d) of the developing unit front bearing 12. According to the present exemplary embodiment, two drive transmission gears are used. However, the present invention is not limited to this configuration and is applicable, as long as at least one drive transmission gear is arranged. The developing roller gear 41 and the toner supplying roller gear 42 are supported by the developing unit front bearing 12 and also temporarily supported by a side cover member 45, which is subsequently attached thereto.

As illustrated in FIG. 4, after the gears (41, 42, 43, and 44) are attached to the developing unit front bearing 12, the side cover member 45 is attached to the gears in such a manner that the gears are sandwiched by the side cover member 45 and the developing unit front bearing 12. This process is called a side cover member attachment process. As illustrated in FIG. 1B, the developing unit front bearing 12 and the side cover member 45 are attached to each other by engaging engaging portions (45t and 45b) formed on the side cover member 45 in holes (12t and 12b) formed in the developing unit front bearing 12, respectively. According to the present exemplary embodiment, snap-fit engaging portions are used to attach the side cover member 45 to the developing unit front bearing 12. However, screws or the like may be used instead of the engaging portions. As a result of the above attachment processes, the developing unit front bearing 12 and the side cover member 45 support the drive transmission gears 43 and 44 and temporarily support the developing roller gear 41 and the toner supplying roller gear 42.

The component obtained by combining the developing unit front bearing 12, the gears (41, 42, 43, and 44), and the side cover member 45 through the above processes is called a developing gear unit 40.

Next, temporary support for the developing roller gear 41 and the toner supplying roller gear 42 will be described. First, temporary support for the gears by the developing unit front bearing 12 will be described. As illustrated in FIG. 4, the developing roller gear 41 is temporarily supported by a plurality of side walls 12e of the developing unit front bearing 12 and the toner supplying roller gear 42. Similarly, the toner supplying roller gear 42 is temporarily supported by a plurality of side walls 12f of the developing unit front bearing 12 and the developing roller gear 41. In the present exemplary embodiment, the gear portions of the developing roller gear 41 and the toner supplying roller gear 42 engage with each other.

Figure 5:
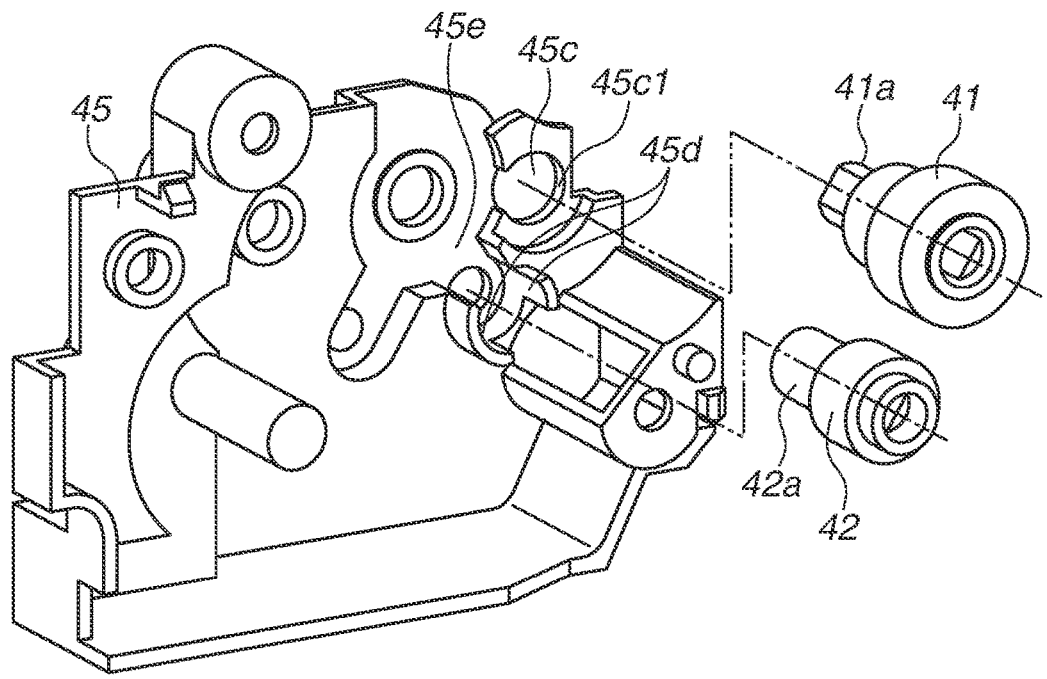
FIG. 5 illustrates a method for assembling the gear unit according to the exemplary embodiment.

Next, temporary support for the gears by the side cover member 45 will be described. As illustrated in FIG. 4, a support shaft 41a extends from one end of the developing roller gear 41. A temporary support hole 45c is formed in the side cover member 45 to allow the support shaft 41a of the developing roller gear 41 to penetrate through the temporary support hole 45c. By having the support shaft 41a of the developing roller gear 41 penetrate through the temporary support hole 45c in the side cover member 45, the developing roller gear 41 is temporarily supported by the side cover member 45. In the present exemplary embodiment, a surface 45c1 where the temporary support hole 45c is formed serves as a temporary support portion. Temporary support for the toner supplying roller gear 42 by the side cover member 45 will be described below. A support shaft 42a extends from one end of the toner supplying roller gear 42. By having the support shaft 42a surrounded by a cylindrical-shaped portion 45d that is a protruding portion of the side cover member 45 and by an end surface 45e of the side cover member 45, the toner supplying roller gear 42 is temporarily supported. In the present exemplary embodiment, the cylindrical-shaped portion 45d that is a protruding portion and the end surface 45e serve as temporary support portions (FIG. 5).

Figure 6:
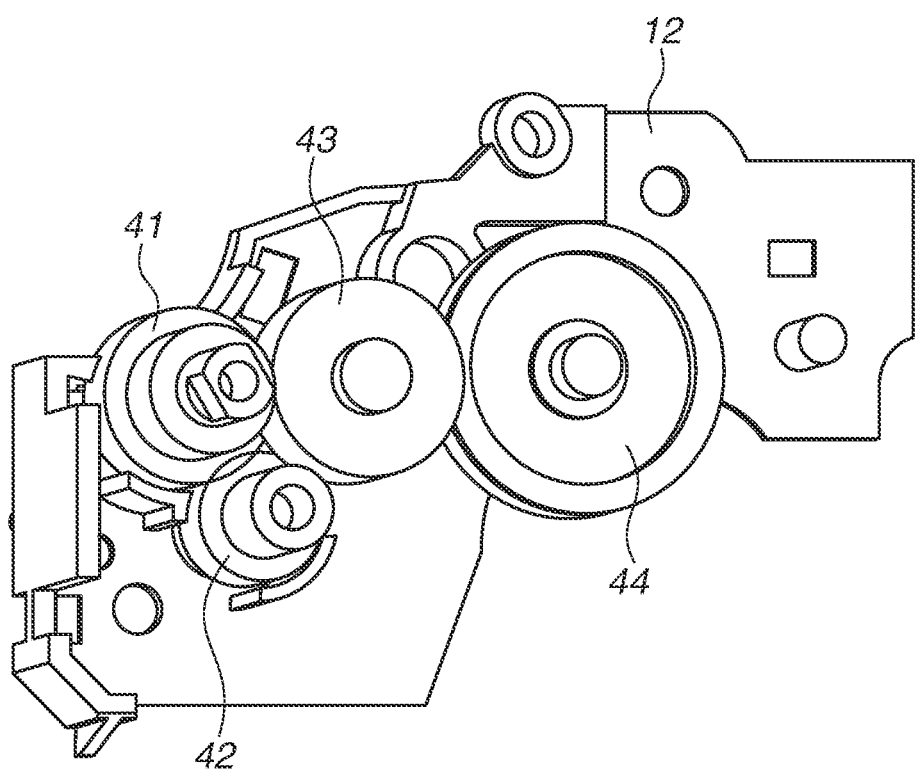
FIG. 6 illustrates the gear unit according to the exemplary embodiment.

As illustrated in FIG. 6, the gears (41, 42, 43, and 44) included in the above-described developing gear unit 40 are arranged in such a manner that the gears can transmit driving force. FIG. 6 illustrates the developing gear unit 40 (the side cover member 45 is not illustrated).

According to the present exemplary embodiment, the developing unit front bearing 12 and the side cover member 45 sandwich and support the gears. In this way, the developing gear unit 40 can be distributed as a commodity product.

With the configuration in which the temporary support portions of the side cover member 45 support the gears (41, 42, 43, 44) held in the developing gear unit 40, even if the gears receive shake and shock during transport or the like, the gears are held in respective predetermined positions without falling out of the developing gear unit 40.

(Developing Device Assembly Procedure)

Figure 7:
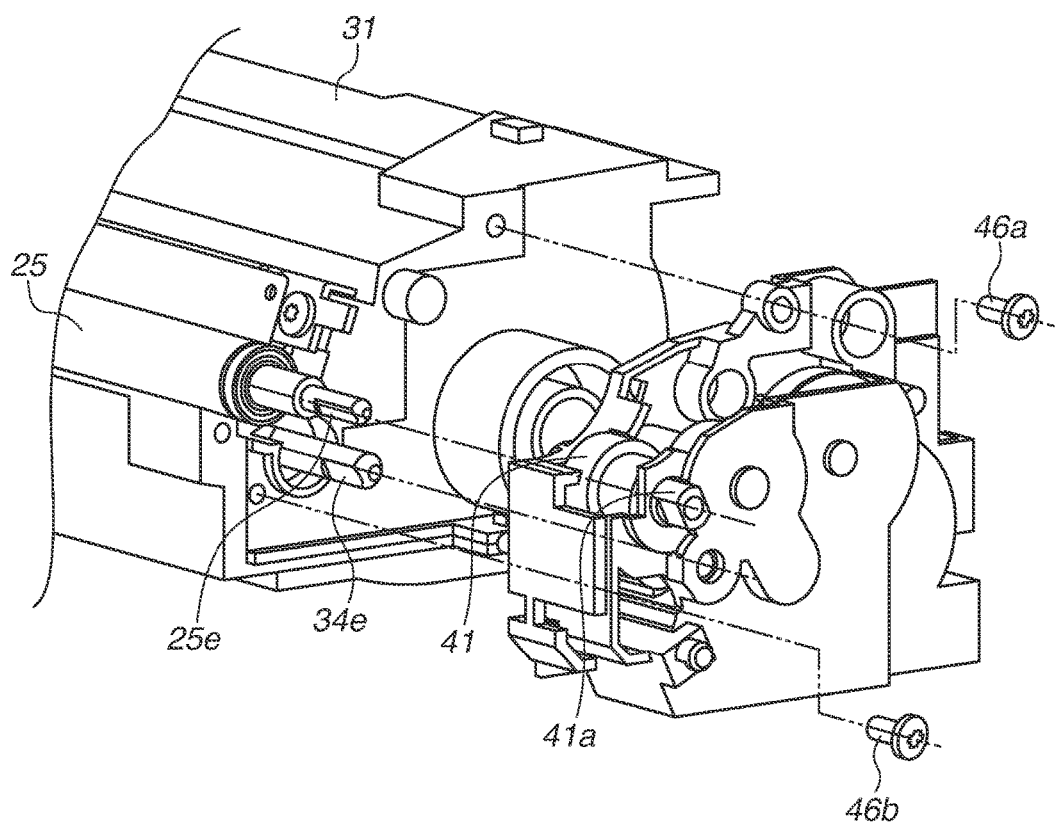
FIG. 7 illustrates a method for assembling a developing device according to the exemplary embodiment.

Next, an assembly procedure for manufacturing a developing device 4 will be described process by process. FIG. 7 illustrates a process of attaching the developing gear unit 40 to the developing device to which the toner supplying roller 34 and the developing roller 25 have been attached. As illustrated in FIG. 7, the prepared developing gear unit 40 is attached to the developing frame 31 accommodating developer and is fixed thereto with screws (46a and 46b).

In this process, the developing roller gear 41 and the toner supplying roller gear 42 that are temporarily supported in the developing gear unit 40 engage with a developing roller shaft 25e protruding from an end of the developing roller 25 and a toner supplying roller shaft 34e protruding from an end of the toner supplying roller 34, respectively, thereby releasing the temporary support in the developing gear unit 40. As a result of the release of the temporary support, the developing roller gear 41 and the toner supplying roller gear 42 are supported by the respective roller shafts and detached from the respective temporary support portions in the developing gear unit 40. In the present exemplary embodiment, before the developing roller gear 41 engages with the developing roller 25, the developing roller gear 41 has been supported by the temporary support portion 45c1 of the side cover member 45 in the developing gear unit 40. When the developing roller gear 41 is attached to the developing frame 31 having the developing roller 25, the developing roller gear 41 engages with the developing roller 25 and is supported by the developing roller 25. By this engagement, after the developing gear unit 40 is attached to the developing frame 31, the gears are no longer supported by the side cover member 45. In other words, the side cover member 45 in the developing gear unit 40 provides a temporary support for the gears. More specifically, if the developing gear unit 40 is seen as an individual unit, the side cover member 45 supports the gears until the developing gear unit 40 engages with the developer bearing member. To transmit driving force received from outside, the developing roller 25 and the toner supplying roller 34 engage with the developing roller gear 41 and the toner supplying roller gear 42 in rotation directions, respectively.

Figure 8:
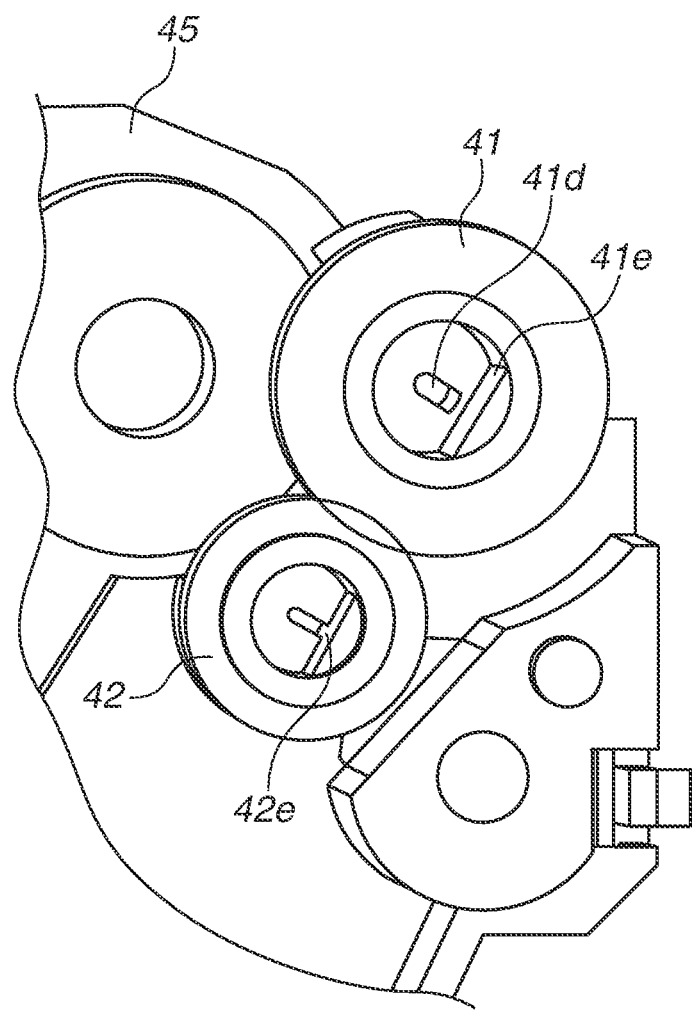
FIG. 8 illustrates the method for assembling the developing device according to the exemplary embodiment.

Next, a configuration in which the developing roller 25 and the toner supplying roller 34 respectively engage with the developing roller gear 41 and the toner supplying roller gear 42 in rotation directions, will be described. FIG. 8 illustrates the developing gear unit 40 seen from the inside thereof. FIG. 8 illustrates a state where the developing roller gear 41 and the toner supplying roller gear 42 are temporarily supported by the side cover member 45 (the developing unit front bearing 12 is not illustrated). As illustrated in FIG. 8, the developing roller gear 41 and the toner supplying roller gear 42 are provided with engagement holes (D-shaped holes) 41e and 42e, respectively. The engagement holes (D-shaped holes) 41e and 42e are used for engaging the developing roller gear 41 and the toner supplying roller gear 42 with the respective roller shafts. In addition, as illustrated in FIG. 7, roller shaft engaging portions (25e and 34e in FIG. 7) are formed on the developing roller shaft 25e and the toner supplying roller shaft 34e that respectively engage with the corresponding gears. The roller shaft engaging portions (25e and 34e in FIG. 7) engage with the gear engagement holes (41e and 42e), respectively, and thereby the roller shafts support the respective gears. While the engagement holes according to the present exemplary embodiment have a D-shaped cut, the engagement holes may have an H-shaped cut to be held by two sides.

To engage the roller shaft engaging portions (25e and 34e) with the gear engagement holes (41e and 42e), respectively, the phases of the rotation directions of the rollers and the respective gears need to be synchronized. In the present exemplary embodiment, the phases of the gears and roller shafts are synchronized by rotating the developing roller gear 41.

Figure 9:
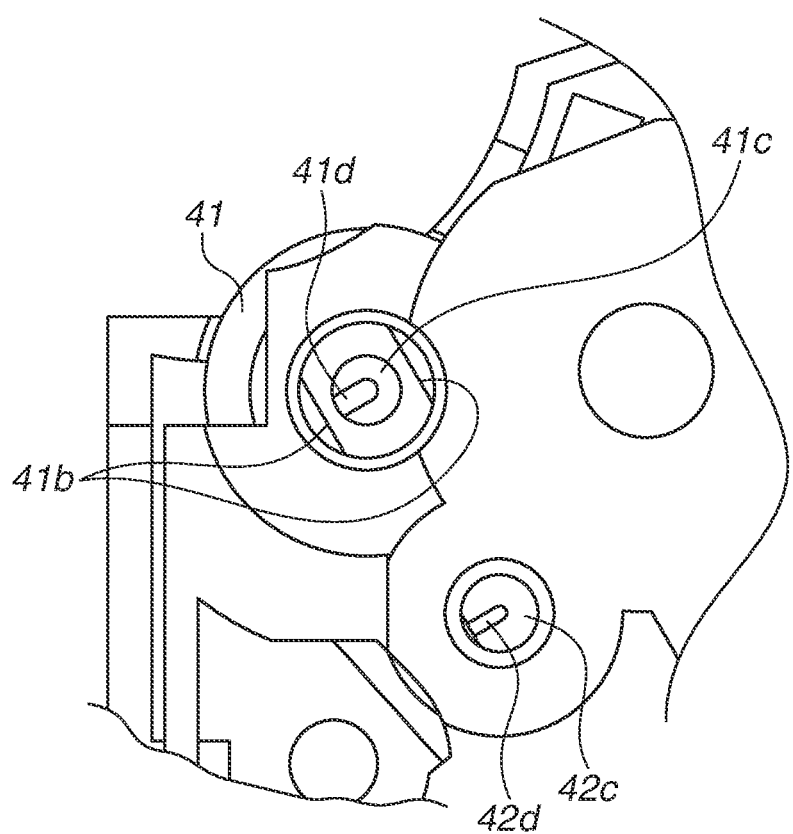
FIG. 9 illustrates the method for assembling the developing device according to the exemplary embodiment.

Next, a mechanism for synchronizing the phases in the rotation directions will be described. As illustrated in FIG. 7, the support shaft 41a of the developing roller gear 41 protrudes outward from the side cover member 45 in its longitudinal direction. As illustrated in FIG. 9, to synchronize the phase of the developing roller gear engagement hole 41e with that of the developing roller shaft 25e, a holding portion 41b for rotating the developing roller gear 41 is formed on the developing roller gear support shaft 41a. By holding and rotating the holding portion 41b protruding from the developing gear unit 40, the developing roller shaft 25e engages in the developing roller gear engagement hole 41e when their phases are synchronized. In addition, to detect the phases in advance, a phase detection ditch 41d serving as a detection portion is formed on the developing roller gear 41 (FIG. 9).

By detecting the phase detection ditch 41d before rotating the developing roller gear 41, a predetermined rotation angle can be determined in advance. In addition, by rotating the developing roller gear support shaft 41a, the phase of the toner supplying roller shaft 34e and that of the toner supplying roller gear 42 are also synchronized. As described above, all the gears in the developing gear unit 40 are connected to transmit driving force. Thus, rotating the developing roller gear 41 can rotate the toner supplying roller gear 42 with a predetermined phase and engage the toner supplying roller gear 42 with the toner supply roller shaft 34e.

In the present exemplary embodiment, the side cover member 45 temporarily supports both of the developing roller gear 41 and the toner supplying roller gear 42, and this temporary support is released after the aforementioned engagement has been made. However, the present invention is not limited thereto. For example, the side cover member 45 may temporarily support only the developing roller gear 41. In other words, the side cover member 45 may temporarily support at least one member. In addition, if the device has no toner supplying roller, a gear unit that does not include a toner supplying roller gear may be used. Further, a gear unit that includes a drive gear for driving a toner conveyance screw, in addition to the developing roller gear 41, may be used.

According to the present exemplary embodiment, by forming the gears as a unit, the complexity of the assembly work can be reduced, and the number of assembly processes can be reduced, thereby facilitating manufacture of a developing device and a process cartridge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012708, filed Jan. 26, 2015, which is hereby incorporated by reference herein in its entirety.

What is claimed is:

1. A gear unit, being a part of a cartridge which is capable of being mounted on an image forming apparatus, comprising:
   a bearing for rotatably supporting a developer bearing member for developing an electrostatic image;
   a developing gear configured to include an engaging portion that is engagable with a shaft of the developer bearing member;
   at least one drive transmission gear configured to be engaged with the developing gear in such a manner that drive force is transmitted to the developing gear; and
   a cover member configured to be attached to the bearing so as to sandwich the developing gear and the drive transmission gear between the bearing and the cover member,
   wherein the cover member supports the developing gear, and
   wherein the cover member includes a temporary support portion for temporarily supporting the developing gear before the engaging portion engages with the shaft of the developer bearing member.

2. The gear unit according to claim 1, wherein the cover member includes a hole, and a surface of the cover member, in which the hole is formed, is the temporary support portion.

3. The gear unit according to claim 1, wherein the cover member includes a protruding portion, and the protruding portion is the temporary support portion.

4. The gear unit according to claim 1, further comprising a supplying gear configured to include an engaging portion that engages with a shaft of a supplying member for supplying developer to the developer bearing member,
   wherein the cover member temporarily supports the supplying gear.

5. The gear unit according to claim 4, wherein the developing gear and the supplying gear are provided with D-shaped holes respectively.

6. The gear unit according to claim 1,
   wherein the developer bearing member includes a holding portion for synchronizing phases in rotation directions.

7. The gear unit according to claim 1, wherein the developing gear includes a detection portion for detecting a phase in a rotation direction.

8. The cartridge comprising:
   an image bearing member; and
   the gear unit according to claim 1.

9. An image forming apparatus comprising
   the gear unit according to claim 1,
       wherein the image forming apparatus forms an image on a recording material.

10. The gear unit according to claim 1, wherein the developing gear and the drive transmission gear are arranged in a direction crossing a longitudinal direction of the developing bearing member.

11. The gear unit according to claim 1, wherein the gear unit is attached to the developing frame accommodating developer.

12. The gear unit according to claim 11, wherein the gear unit is fixed to the developing frame with screws.

13. The gear unit according to claim 1, further comprising:
   a supplying gear configured to include an engaging portion that engages with a shaft of a supplying member for supplying developer to the developer bearing member,
   wherein the supplying gear is sandwiched between the bearing and the cover member.

14. A developing device comprising:
   the gear unit according to claim 1; and
   the developing frame for accommodating developer,
   wherein the gear unit is attached to the developing frame.

15. A developing device comprising:
   a developer bearing member configured to develop an electrostatic image;
   a frame configured to accommodate developer;
   a bearing configured to be attached to the frame and rotatably support the developer bearing member;
   a developing gear configured to include an engaging portion that engages with a shaft of the developer bearing member;
   at least one drive transmission gear configured to be engaged with the developing gear in such a manner that drive force is transmitted to the developing gear; and
   a cover member configured to be attached to the bearing so as to sandwich the developing gear and the drive transmission gear between the bearing and the cover member,
   wherein the cover member is released from supporting the developing gear temporarily after the developing gear is engaged with the developer bearing member.

16. The developing device according to claim 15,
   wherein, until the bearing is attached to the frame, the developing gear is temporarily supported by the cover member, and after the developing gear is engaged with the developer bearing member, the temporary support is released.

17. The developing device according to claim 15,
   wherein the cover member includes a hole, and a surface of the cover member, in which the hole is formed, is the temporary support portion.

18. The developing device according to claim 15,
   wherein the cover member includes a protruding portion, and the protruding portion is the temporary support portion.

19. The developing device according to claim 15, further comprising
   a supplying gear configured to include an engaging portion that engages with a shaft of a supplying member for supplying developer to the developer bearing member,
   wherein the cover member temporarily supports the supplying gear.

20. The developing device according to claim 15,
   wherein the developing gear includes a holding portion for synchronizing phases in rotation directions.

21. The developing device according to claim 15,
   wherein the developing gear includes a detection portion for detecting a phase in a rotation direction.

22. The developing device according to claim 15, wherein the developing gear and the drive transmission gear are arranged in a direction crossing a longitudinal direction of the developing bearing member.

23. The developing device according to claim 15, further comprising:

a supplying gear configured to include an engaging portion that engages with a shaft of a supplying member for supplying developer to the developer bearing member, wherein the supplying gear is sandwiched between the bearing and the cover member.

24. A method for manufacturing a gear unit, being a part of a cartridge which is capable of being mounted on an image forming apparatus, including a bearing for rotatably supporting a developer bearing member developing an electrostatic image, and including a developing gear that includes an engaging portion for engaging with a shaft of the developer bearing member, the method comprising:

attaching the developing gear and at least one drive transmission gear to the bearing; and attaching a cover member to the bearing in such a manner that the cover member holds the developing gear, wherein, when the cover member is attached to the bearing, the cover member is engaged with the developing gear, and the developing gear is temporarily supported in the gear unit before the engaging portion engages with the shaft of the developer bearing member.

* * * * *